April 5, 1932.　　　　K. E. LYMAN　　　　1,852,325

BRAKE

Filed Nov. 17, 1928　　2 Sheets-Sheet 1

INVENTOR.
KENNETH E. LYMAN
BY
ATTORNEY

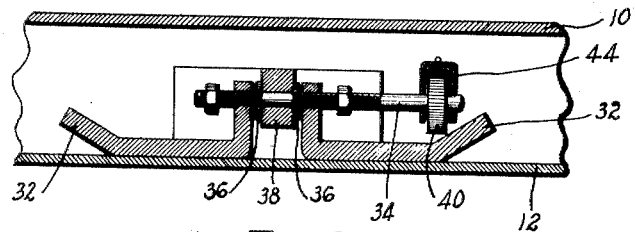
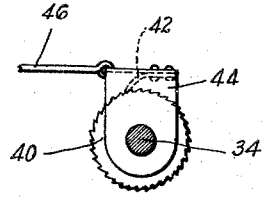
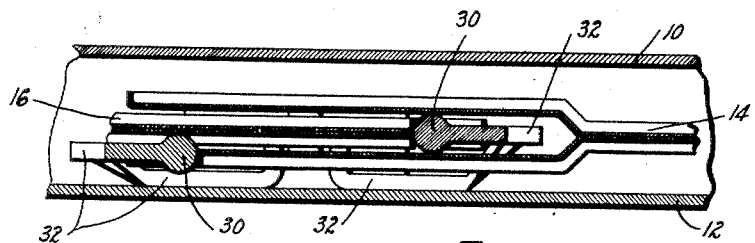
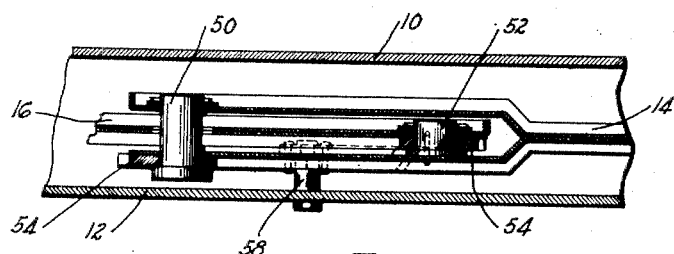
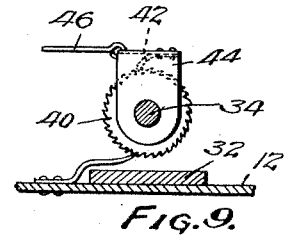
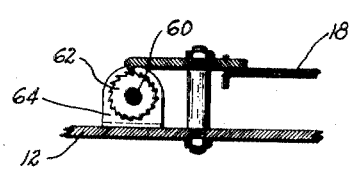
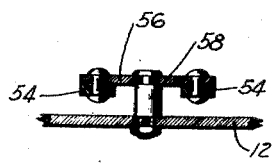

Patented Apr. 5, 1932

1,852,325

UNITED STATES PATENT OFFICE

KENNETH E. LYMAN, OF ROCKFORD, ILLINOIS, ASSIGNOR TO BENDIX BRAKE COMPANY, OF SOUTH BEND, INDIANA, A CORPORATION OF ILLINOIS

BRAKE

Application filed November 17, 1928. Serial No. 320,028.

This invention relates to brakes, and is illustrated as embodied in an internal expanding automobile brake. An object of the invention is to provide a simple but effective brake adjustment which is operated automatically.

In one desirable arrangement, the brake anchors, which preferably are engaged by a pair of overlapping shoes, are interconnected by means operated automatically to adjust the anchors to compensate for wear of the brake, and shown as operated by a connection from the primary or floating shoe of the brake. The interconnection is illustrated in two forms, one being a right-and-left threaded adjustment and the other being in effect a pivoted adjustable bellcrank lever or swinging plate.

The above and other objects and features of the invention, including various novel and desirable details of construction, will be apparent from the following description of the illustrative embodiments shown in the accompanying drawings, in which:

Figure 3 is a partial section on the line 3—3 of Figure 1, showing the anchorage adjustment;

Figure 4 is a partial section through the anchorage, on the line 4—4 of Figure 1;

Figure 5 is a partial section through the pawl mechanism, on the line 5—5 of Figure 1;

Figure 6 is a partial section, on the line 6—6 of Figure 2, through the anchorage of the second modification;

Figure 7 is a partial section through the adjustment of this modification, on the line 7—7 of Figure 2;

Figure 8 is a partial section through the pawl mechanism of Figure 2, on the line 8—8 of Figure 2;

Figure 9 is a modification of the pawl mechanism.

Figure 1:
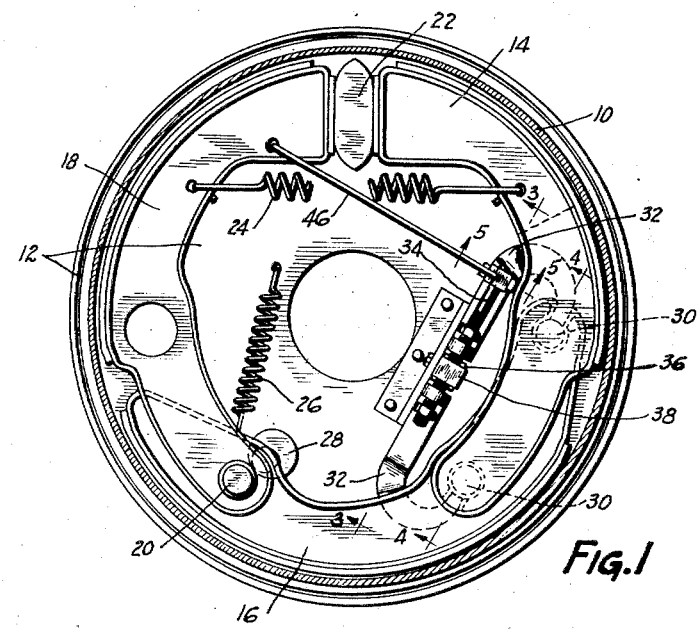
Figure 1 is a vertical section through one form of the brake, just inside the head of the brake drum, and showing the brake shoes in side elevation.

The brakes selected for illustration each include a rotatable drum 10, at the open side of which is a suitable support such as a backing plate 12, and within which is arranged the friction means, illustrated as including an anchored auxiliary shoe 14, an anchored secondary shoe 16, and a primary shoe 18 connected to the secondary shoe by means such as a floating pivot 20. The primary and auxiliary shoes 18 and 14 respectively are alike and therefore interchangeable.

The brake is applied by suitable means such as a double cam 22, against the resistance of a return spring 24, shoe 16 being applied by the primary shoe 18 against the resistance of an auxiliary return spring 26. The idle or released position of the secondary shoe 16 may be determined by an adjustable eccentric stop 28.

The present invention relates primarily to the adjustment of the shoe anchorage. In the illustrated forms, the anchored ends of the shoes 14 and 16 overlap each other, shoe 14 being shown forked to form arms straddling the end of shoe 16.

In the modification of Figures 1 and 3–5, the anchored ends of shoes 14 and 16 are slotted to be in pivotal thrust engagement with rounded portions 30 of adjustable members 32 threaded on right-and-left threaded portions of an adjusting member 34. Member 34 has nuts or other stops 36 holding it against endwise movement in a bracket 38 in which it is rotatably journaled.

The adjusting member is provided with a ratchet wheel 40 keyed or pressed thereon, and engaged by a spring pawl 42 carried by a U-shaped support 44 pivoted on member 34 and embracing the ratchet 40. An operating link 46 pivoted to support 44 is connected at its other end to the cam end of shoe 18.

In operation, each time the brake is applied the pawl 42 is oscillated back and forth, shifting ratchet 40 on the forward stroke but moving idly on the back stroke while ratchet 40 is held by the friction of the parts (or as shown in Figure 9 a suitable holding pawl may be provided if preferred). Thus the anchorage is constantly and automatically adjusted in such a manner as to give pawl 42 a throw, in applying the brake, of not more than the length of one tooth of ratchet 40.

Figure 2:
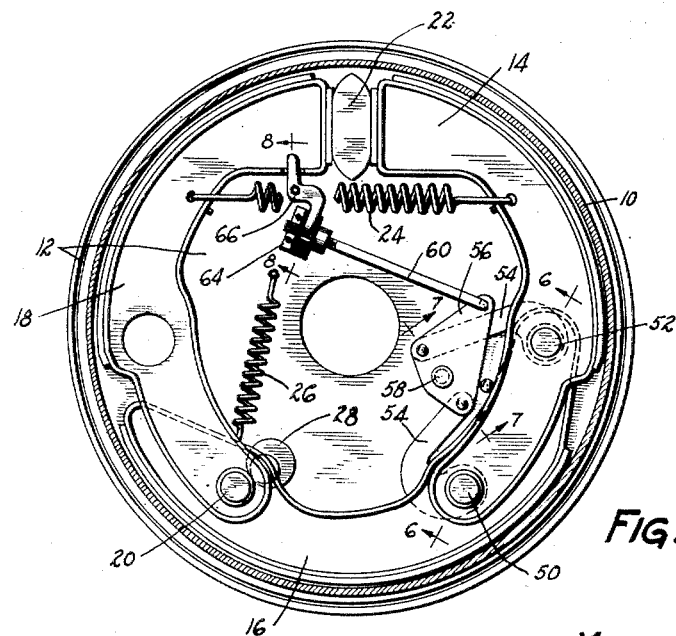
Figure 2 is a similar section through a second form of the brake.

In Figures 2 and 6-8, shoes 14 and 16 are anchored on pivots 50 and 52 connected by compression links 54 to an angularly-adjustable plate 56 which forms in effect a three-arm bellcrank lever mounted on a fixed pivot or anchor fulcrum 58 carried by the backing plate. The connection between the links 54 and the plate 56 is a pivotal one permitting relative movement between these parts.

Plate 56 is rocked, to adjust the anchors, by means such as a compression link 60, having its opposite end threaded to receive a ratchet nut 62, and then extending slidably through an opening in a bracket 64 carried by the backing plate. Ratchet 62 is operated by a spring pawl 66 pivoted on the backing plate and having its end embraced by an opening or slot in the cam end of shoe 18. If no holding pawl is provided, the friction of the parts may be relied upon to hold them in adjusted position.

While two illustrative embodiments have been described in detail, it is not my intention to limit the scope of the invention to those particular embodiments, or otherwise than by the terms of the appended claims.

I claim:

1. A brake having two anchors and a friction element, in combination with means automatically operated by the friction element to adjust said two anchors simultaneously.

2. A brake having overlapping shoes provided with separate anchors, in combination with means automatically operated by one of the shoes to adjust said anchors simultaneously.

3. A brake having, in combination, a pair of shoes having anchors, an unanchored shoe operatively connected to at least one of the anchored shoes, and means operated by movement of the unanchored shoe for adjusting at least one of said anchors.

4. A brake having, in combination, a pair of shoes having anchors, an unanchored shoe operatively connected to at least one of the anchored shoes, and means operated by movement of the unanchored shoe for adjusting both of said anchors.

5. A brake having, in combination, a pair of shoes having anchors, an unanchored shoe operatively connected to one of the anchored shoes, applying means acting on the other of the anchored shoes and on the unanchored shoe, and means operated by movement of the unanchored shoe for adjusting at least one of said anchors.

6. A brake having, in combination, a pair of shoes having anchors, an unanchored shoe operatively connected on one of the anchored shoes, applying means acting on the other of the anchored shoes and on the unanchored shoe, and means operated by movement of the unanchored shoe for adjusting both of said anchors.

7. A brake comprising, in combination, a shoe having an anchor; an unanchored shoe arranged to apply the anchored shoe, and a connection from the unanchored shoe for adjusting said anchor.

8. A brake comprising, in combination, a shoe having an anchor at one end, an unanchored shoe connected to the other end of the anchored shoe, and a connection from the unanchored shoe for adjusting said anchor.

9. A brake having two anchors, in combination with a pivoted plate connected to said anchors and movable angularly to adjust said anchors.

10. A brake having two anchors, in combination with a pivoted member connected to said anchors and movable angularly to adjust said anchors, and means for automatically turning said member to make the adjustment.

In testimony whereof, I have hereunto signed my name.

KENNETH E. LYMAN.